United States Patent [19]

Steininger et al.

[11] Patent Number: 4,913,949

[45] Date of Patent: Apr. 3, 1990

[54] PLANAR, MULTILAYERED, LASER-OPTICAL RECORDING MATERIAL

[75] Inventors: Helmut Steininger, Worms; Horst Binder, Lampertheim, both of Fed. Rep. of Germany

[73] Assignee: BASF Aktiengesellschaft, Ludwigshafen, Fed. Rep. of Germany

[21] Appl. No.: 216,616

[22] Filed: Jul. 8, 1988

[30] Foreign Application Priority Data

Jul. 29, 1987 [DE] Fed. Rep. of Germany ....... 3725134

[51] Int. Cl.$^4$ ................................................. B32B 3/02
[52] U.S. Cl. ........................................ 428/64; 428/65; 428/913; 346/76 L; 346/135.1; 369/288; 430/945
[58] Field of Search ............................ 428/64, 65, 913; 346/76 L, 135.1; 369/288; 430/945

[56] References Cited

U.S. PATENT DOCUMENTS 4,041,190  8/1977  Dubois et al.
4,415,650  11/1983  Kido et al.
4,622,261  11/1986  Ochiai.

FOREIGN PATENT DOCUMENTS 61-21416   1/1986  Japan.
61-111294  1/1986  Japan.
61-57389   3/1986  Japan.
223012     3/1987  Japan.
284787    12/1987  Japan.
57287      3/1988  Japan.
57288      3/1988  Japan.
57289      3/1988  Japan.
57290      3/1988  Japan.
156853     6/1988  Japan.
165434     7/1988  Japan.
2062962    5/1981  United Kingdom.

Primary Examiner—Patrick Ryan
Attorney, Agent, or Firm—Keil & Weinkauf

[57] ABSTRACT

A planar, multilayered, laser-optical recording material comprises
(a) a dimensionally stable, optically clear base material composed of a plastics substance and having a structured surface,
(b) a superposed intermediate layer which is insoluble in organic solvents and which acts as a diffusion barrier thereagainst, and superposed thereon
(c) an amorphous, thermally alterable, dye-containing recording layer producible by application from a solution and drying, wherein said intermediate layer (b)
($b_1$) is from 5 to 95 nm thick and, based on (b), consists of
($b_2$) from 88 to 99.5% by weight of an oxide and/or hydrated oxide of one or more of the elements of the group consisting of titanium, zirconium, hafnium, thorium, vanadium, niobium, tantalum, tungsten, aluminum, gallium, indium, silicon, germanium and tin and of
($b_3$) from 0.5 to 12% by weight of a hydrocarbyl and
($b_4$) is producible by dissolving one or more alkoxides of one or more of the abovementioned elements in a polar liquid medium essentially comprising a $C_1$–$C_6$-alkanol, applying this solution to the surface of base material (a) and heat-treating the moist layer obtainable in this way in the presence of water at from 50° to 120° C. for from 5 minutes to 2 hours.

7 Claims, No Drawings

PLANAR, MULTILAYERED, LASER-OPTICAL RECORDING MATERIAL

The present invention provides a novel planar, multilayered, laser-optical recording material of improved application properties, comprising
(a) a dimensionally stable, optically clear base material composed of a plastics material and having a structured surface,
(b) a superposed intermediate layer which is insoluble in organic solvents and which acts as a diffusion barrier thereagainst, and superposed thereon
(c) an amorphous, thermally alterable, dye-containing recording layer producible by application from a solution and drying.

Planar, multilayered, laser-optical recording materials incorporating thermally alterable recording layers which on irradiation with laser beams focused thereon alter their reflectivity in the areas of incidence are known.

In the recording layers of these recording materials, digital data can be written in the form of thermally altered areas by means of pulse code modulated write laser beams focused on the recording layers and perpendicularly incident thereupon. To write analogue data it was also possible to use continuous wave lasers. In the case of written digital data the thermally altered areas, or digital spots, on the recording layers have a round or elliptical shape. In the case of analogue data the thermally altered areas are of any desired shape.

Moreover, these areas can have the form of holes which completely penetrate the recording layers. This is generally referred to as ablative laser-optical data recording. The data are read with a read laser beam by utilizing the difference in reflectivity between the holes and the unaltered areas of the recording layer. To perform the process of reading to high sensitivity and with a high signal-to-noise ratio, it is possible to include a reflector layer which is bared a$ the holes are formed and which give a particularly strong reflection of the read laser beam.

The thermally altered areas can also have the form of pits which may have a cleanly formed wall. This is referred to as deformative laser-optical data recording; the data are read via the diffraction of the light of the read laser beam at the pits.

Yet thermal alteration can also give rise to areas where no ablation or deformation but a change of phase of the recording layer material to another state has taken place. This is referred to as laser-optical data recording by phase change. In general, the phase change serves to reduce the reflectivity and/or increase the light transmittance in the written area$. In certain circumstances, however, the opposite effect is also possible, raising reflectivity and/or reducing the light transmittance. In what follows, the areas thermally altered in this manner are referred to as simply spots.

Furthermore, in the thermally altered areas, one or more constituents of the recording layer may have undergone a chemical reaction, thereby altering the optical properties of the recording layer in the areas in question.

Also, the material of the recording layer, on heating by the write laser beam incident thereupon, can self-expand or be expanded as a result of gas evolving from a layer underneath, so that the recording layer forms a relief structure which incorporates the written data.

To read the data it is generally customary to use continuously emitted read laser beams (continuous wave laser beams) of insufficient power to cause further alterations in the recording layers. These read laser beams are likewise focused on the recording layers and are perpendicularly incident thereupon.

In the read process, in general, the light reflected back by the recording layers is gathered by means of suitable optical arrangements, guided toward customary and known detectors and converted by suitable electronic apparatus into signals.

These write and read processes and the corresponding recording materials suitable therefor are therefore generally referred to as laser-optical.

Recording materials of the kind in question, containing a base material (a), an intermediate layer and a recording layer (c), are known from U.S. Pat. No. 4,551,413. There the intermediate layer comprises a reflection layer of metals such as aluminum, copper, chromium, gold or rhodium. These metals are by nature insoluble in organic solvents. In addition, the intermediate layer and the recording layer (c) may enclose a dielectric layer, for example of silicon dioxide, produced by vacuum vapor deposition or sputtering. The disadvantage here is the complicated method of manufacture of the recording material.

U.S. Pat. No. 4,622,261 discloses a recording material comprising a base material without surface structuring, an intermediate layer and a recording layer, said recording layer being made of metals, semimetals, semiconductors or alloys or of sulfides, oxides, borates, silicates, carbides or nitrides of metals or semimetals or of mixtures thereof. Other possible materials for the recording layer are those mentioned in U.S. Pat. No. 4,415,650. These materials can be dyes or pigments, which are vacuum vapor deposited to produce the recording layer.

The intermediate layer of U.S. Pat. No. 4,622,261 is referred to there as a polysiloxane coating film and prepared from a monomer of the general formula I

$$R_xSi(OR^1)_{4-x} \qquad \text{I}$$

where R and $R^1$ are $C_1$–$C_3$–alkyl or phenyl and x is 0 or 1, 2 or 3. To this end, the monomer is dissolved in a polar organic solvent such as ethanol, and the solution is applied to the surface of the base material and then dried. The monomer layer obtained in this way in a thickness of from 0.1 to 50 μm is heated to from 100 to 50020 C. to give a polysiloxane layer by condensation.

However, the monomer layer can also be cured by heating at the surface to from 400 to 3,000° C. for from 1 to 5 seconds. Suitable heat sources for this purpose are flames, plasma or glow discharges and laser, electron or microwave beams. No particulars are provided concerning the material composition of the resulting intermediate layer. The layer serves primarily to smooth the surface of the base material. It does not improve the tracking of the reading beam over the written data; efficient tracking is in any case very difficult because the surface of the base material has no structuring.

A comparable recording material is known from JP-A-61/011,294. This recording material contains a base material (a), an intermediate layer and a recording layer (c). The intermediate layer comprises colloidal particles from 3 to 10 nm in size prepared by hydrolysis of tetraalkali metal silicides, tetramethylsilane, tetraethylsilane or silicon tetrachloride. These particles are dispersed in alcohol, alkyl acetates or aromatic hydrocarbons and applied to the surface of the base materials (a) and dried, the result being a dry layer thickness of from 0.005 to 0.05 μm. This intermediate layer is inherently irregular, permeable to organic solvents and, what is more, mechanically not very stable, so that the subsequent treatment with organic solutions can cause damage to the surface structure of the base material (a), appreciably lowering the quality of the recording material.

Disadvantages of this kind are also possessed by the recording material known from JP-A-61/057,389. The intermediate layer therein, which is from 20 nm to 50 μm in thickness, comprises a heated organoalkoxysilane or organoaryloxysilane which, based on the silane, contains from 0.1 to 100% by weight of aluminum, titanium, phosphorus, boron, antimony, arsenic, zinc, gold, platinum, gallium, tin, thallium, cerium and/or indium. The recording layer comprises tellurium, zinc, indium, tin, zirconium, aluminum, copper, germanium, bismuth, arsenic, antimony, gallium or silicon.

Moreover, JP-A-61/214,161 discloses a recording material which has a protective layer on the tellurium/tellurium dioxide recording layer and/or on that side of the base material which is remote from the recording layer. This protective layer is produced by applying a solution of colloidal silicon dioxide and tetraethoxysilane in isopropanol to the surfaces in question and drying the wet layers at 70° C. for 24 hours. In place of the silicon alcoholate it is also possible to use zirconium alcoholates or titanium alcoholates.

It is further known from the field of semiconductor technology to produce silicon dioxide insulating layers or masks from organic precursors.

For instance, DE-A-2,944,180 discloses a process where a from 0.2 to 0.3 μm thick silicon dioxide layer is produced by spin coating a solution of 1 part by volume of tetraethoxysilane, 1 part by volume of methanol and about 0.4 part by volume of 0.1 molar nitric acid onto a semiconductor substrate and heat-treating the wet layer at from 600 to 700° C. for about 15 minutes.

DE-A-2,231,912 discloses the production of a silicon dioxide mask by hydrolyzing vinyltrichlorosilane, polymerizing the resulting vinyltrihydroxysilane, dissolving the polymer, applying the polymer solution to a base material, drying the resulting wet polymer layer, imagewise exposure, development, and a two-hour heat-treatment of the resulting relief layer at from 500 to 1,000° C. in an oxidizing atmosphere which is 50% oxygen.

The protective layers known from JP-A-61/214,161 are not suitable, because of their high colloidal silicon dioxide content, for producing intermediate layers (b) which are to cover the surfaces of base materials (a) evenly and without distorting the surface structure thereof.

The processes known from DE-A-2,944,180 and DE-A-2,231,912 do not come into consideration from the start for the production of intermediate layers (b) of laser-optical recording materials comprising base materials (a), intermediate layers (b) and recording layers (c) because of the extreme reaction conditions involved.

It is an object of the present invention to provide a novel, planar, multi-layered, laser-optical recording material of improved application properties, comprising
(a) a dimensionally stable, optically clear base material composed of a plastics substance and having a structured surface,
(b) a superposed intermediate layer which is insoluble in organic solvents and which acts as a diffusion barrier thereagainst, and superposed thereon
(c) an amorphous, thermally alterable, dye-containing recording layer producible by application from a solution and drying,
which is free of the prior art disadvantages.

We have found that this object is achieved with a planar, multilayer, laser optical recording material, comprising
(a) a dimensionally stable, optically clear base material composed of a plastics substance and having a structured surface,
(b) a superposed intermediate layer which is insoluble in organic solvents and which acts as a diffusion barrier thereagainst, and superposed thereon
(c) an amorphous, thermally alterable, dye-containing recording layer producible by application, from a solution and drying,
wherein said intermediate layer (b)
($b_1$) is from 5 to 95 nm thick and, based on (b), consists of
($b_2$) from 88 to 99.5% by weight of an oxide and/or hydrated oxide of one or more of the elements of the group consisting of titanium, zirconium, hafnium, thorium, vanadium, niobium, tantalum, tungsten, aluminum, gallium, indium, silicon, germanium and tin and of
($b_3$) from 0.5 to 12% by weight of a hydrocarbyl and
($b_4$) is producible by dissolving one or more alkoxides of one or more of the abovementioned elements in a polar liquid medium essentially comprising a $C_1$-$C_6$-alkanol, applying this solution to the surface of base material (a) and heat-treating the moist layer obtainable in this way in the presence of water at from 50 to 120° C. for from 5 minutes to 2 hours.

Here the term planar embraces all spatial forms which are appreciably less thick than long and wide. Accordingly, the recording material in question here can be for example in tape, sheet or else in particular in disk form, the recording materials in disk form generally also being referred to as data disks.

The term amorphous indicates that the material of the recording layer has no crystalline areas larger than the thermally altered areas, the material being instead optically isotropic to this order of magnitude.

The term structured surface indicates that there are concentric or spiral grooves or otherwise non-randomly arranged elevations and/or depressions present in the surface of the base material. This structuring in the micrometer or submicrometer range generally serves the accurate guidance or tracking of the write and read laser beams and the coding and relocating of the data.

An essential constituent of the recording material according to the invention is the intermediate layer (b) to be used according to the invention.

This intermediate layer (b) covers the structured surface of the base material (a) underneath completely to a uniform thickness, so that the surface structure in question is not for example distorted by particularly thick deposits in the depressions of the structure.

The intermediate layer (b) according to the invention is from 5 to 95 nm in thickness. With thicknesses below 5 nm there is a danger in that the intermediate layer (b) will no longer completely cover the surface of the base material and that instead it will form islands of differing sizes in a sea of bare surface on the base material, so that the intermediate layer (b) will no longer act as a diffusion barrier either. With thicknesses above 95 nm, by contrast, the surface structure of the base material (a) may become distorted because the fine structural elements present may be covered over by the material of the intermediate layer.

If, however, the thickness is kept within the range from 5 to 95 nm, the intermediate layer (b) faithfully follows and uniformly covers the surface structure of the base material (a), forming neither islands nor undesirably thick deposits in the depressions nor an undesirably thin cover over the elevations of the structure. Of advantage is here a thickness for the intermediate layer within the range from 20 to 70 nm. Of very particular advantage is here a thickness within the range from 30 to 60 nm, the range from 50 to 60 nm being most suitable as regards the material and manufacturing requirements on the one hand and the uniform cover of the surface structure of the base material (a) and the barrier action against organic solvents on the other.

According to the invention, the intermediate layer (b) consists to the extent of from 88 to 99.5% by weight of an oxide and/or hydrated oxide of one or more of the elements of the group consisting of titanium, zirconium, hafnium, thorium, vanadium, niobium, tantalum, tungsten, aluminum, gallium, indium, silicon, germanium and tin.

Oxides and/or hydrated oxides of these elements have proved to be particularly highly suitable for the construction of the intermediate layer (b), compared with those of other elements such as chromium, manganese, iron or nickel, because they are capable of forming homogeneous, optically clear, mechanically firm, non-brittle, crack-resistant, impermeable, thin layers which over their entire extension have the same or substantially the same thickness. Substantially the same here is to be understood as meaning that any deviations in thickness are too small to have any effect on the range of properties of the intermediate layer (b).

Of the oxides and/or hydrated oxides mentioned particular preference is given to those of the elements of the group consisting of titanium, zirconium, aluminum, silicon and tin, since they make it possible in a simple manner to further optimize and adapt the already advantageous properties of the intermediate layer (b) to the surface properties of the base material (a) on the one hand and the properties of the recording layer (c) on the other.

The oxides and/or hydrated oxides mentioned are present in the intermediate layer (b) in an amount of from 88 to 99.5% by weight. If the oxide and/or hydrated oxide content is below 88% by weight, then the quality of the intermediate layer in question is low, in particular its hardness, its resistance to organic solvents and its diffusion barrier action thereagainst being adversely affected. If, however, the content is above 99.5%, there is a danger that the intermediate layer in question will become brittle and sensitive to mechanical shock and, what is more, will tend to form cracks with time, which is highly injurious to its diffusion barrier action.

By contrast, an intermediate layer (b) which has an oxide and/or hydrated oxide content of from 88 to 99.5% by weight has an advantageous range of properties and performs the desired technical functions very proficiently. Even more advantageous is a content of from 92 to 98%, in particular from 94 to 95.5% by weight, especially if the oxides and/or hydrated oxides are those of elements of the group consisting of titanium, zirconium, aluminum, silicon and tin.

The intermediate layers (b) may contain oxides and/or hydrated oxides of a plurality of the elements of the group mentioned. However, it is preferred to use the oxide and/or hydrated oxide of a single one of the elements of the group mentioned for the construction of the intermediate layer (b).

According to the invention, the intermediate layer (b) further contains from 0.5 to 12% by weight, based on (b), of a hydrocarbyl. Hydrocarbyl here comprises in particular $C_1$–$C_6$-alkyl, of which a certain proportion may additionally contain oxygen atoms bonded to the alkyl in the form of carboxyl, oxo, aldehyde or ether functions. These hydrocarbyl radicals, which may additionally contain oxygen atoms, may be present in a small amount in the inorganic matrix of the intermediate layer (b) as separate substances. The predominant proportion, however, of these hydrocarbylradicals is bonded via oxygen atoms to one or more of the elements of the group mentioned. Here the ratio between bonded hydrocarbyl radicals on the one hand and separate compounds which contain these radicals is of minor importance for the range of properties of the intermediate layer (b); the range of properties is chiefly affected by the total hydrocarbyl content. Below 0.5% by weight it gives rise to the abovementioned disadvantages, such as higher brittleness, sensitivity to mechanical shock and crack formation tendency. Above 12% by weight, it reduces the hardness, the resistance to organic solvents and the diffusion barrier action of the intermediate layer in question. It is also possible for cloudiness to arise, caused by deposits or bubble formation. It is of particular advantage if the hydrocarbyl content is within the range from 2 to 8% by weight, in particular from 4.5 to 6% by weight, based on the intermediate layer (b).

Accordingly, a very particularly advantageous intermediate layer (b) consists of
from 94 to 95.5% by weight of an oxide and/or hydrated oxide of an element of the group consisting of titanium, zirconium, aluminum, silicon and tin and of
from 4.5 to 6% by weight of a hydrocarbyl.

The composition of the intermediate layer (b) to be used according to the invention can be determined in a simple manner by means of the ESCA method. ESCA (electron spectroscopy for chemical analysis) is especially suitable for the in-depth analysis of thin layers. The thin layers are first pretreated to remove surface impurities and then exposed in a high vacuum to X-rays, for example MgK$_\alpha$ radiation of energy E 1253.6 eV, the energy distribution of the electrons emitted by the sample under the influence of the X-rays being recorded. The spectra thus obtained reveal not only the nature and the weight ratio of the atoms present in the sample but also, quantitatively, their different bonding states, from which information it is directly possible to infer the types and quantities of compounds present. Instruments for performing ESCA measurements are commercially available.

The particular advantageous properties and the external shape of the intermediate layer (b) according to the invention are also directly contingent upon the particular method according to the invention used for preparing it and are producible by other methods of preparation either not at all or only to a very limited degree. At best the other methods produce intermediate layers embodying only individual features but not their totality. These isolated individual features, moreover, are not reproducible reliably, nor are they optimally adaptable to one another. For the time being it remains an open question which effects of the manner of preparation according to the invention are ultimately responsible for the desired features and the external shape of the intermediate layer (b); what is crucial is that the intermediate layer (b) is exactly reproducible by the particular method of preparation.

According to the invention, the production of intermediate layer (b) starts from the solution of one or more alkoxides of one or more elements of the aforementioned group in a polar, liquid medium which essentially comprises a $C_1$–$C_6$-alkanol. To this end, the alkoxides are dissolved in process step 2.1 in the polar liquid medium. Advantageously, this process step is carried out under an inert gas, while otherwise the customary and known mixing and dissolving techniques are used.

The alkoxides used here are in particular those which are derived from $C_1$–$C_6$-alkanols, such as methanol, ethanol, n-propanol, isopropanol, n-butanol, sec-butanol, tert-butanol, n-pentyl alcohol, isopentyl alcohol, neopentyl alcohol, n-hexanol, hexan-2-ol, hexan-3-ol, cyclopentanol or cyclohexanol. Accordingly, the pertinent alkoxides of the elements mentioned contain methoxy, ethoxy, n-propyloxy, 2-propyloxy, 1-butyloxy, 2-butyloxy, tert-butoxy, 1-pentyloxy, isopentyloxy, neopentyloxy, 1-hexyloxy, 2-hexyloxy, 3-hexyloxy, cyclopentyloxy and/or cyclohexyloxy radicals, of which the methoxy, ethoxy and isopropyloxy radicals are preferred and the methoxy and ethoxy radicals are very particularly preferred.

Furthermore, a given alkoxide of one of the elements of the group mentioned may have identical or different alkoxide radicals, for example methoxy and ethoxy radicals. However, the alkoxide may also contain only one kind of alkoxide radical, for example only methoxy or only ethoxy radicals. It is also possible, however, to use mixtures of different alkoxides of one element together, for example the methoxide together with the ethoxide.

It is also possible to use mixtures of alkoxides of different elements, in which case the alkoxides may contain either alkoxide radicals of the same kind, for example methoxy or ethoxy radicals, or alkoxide radicals of different kinds, for example methoxy and ethoxy radicals.

The use of an alkoxide of a single element where all the alkoxide radicals are the same is preferred. Accordingly, the particularly preferred alkoxides are the methoxides and ethoxides of titanium, zirconium, hafnium, thorium, vanadium, niobium, tantalum, tungsten, aluminum, gallium, indium, silicon, germanium or tin. Of these in turn the methoxides and ethoxides of titanium, zirconium, aluminum, silicon or tin are very particularly preferred.

These alkoxides are known and can be prepared by the methods described in detail in Houben-Weyl, Methoden der Organischen Chemie, Volume VI/2, Oxygen Compounds I, Part 2, Georg Thieme Verlag, Stuttgart 1963, on pages 5 to 34.

For the purposes of the present invention, a polar liquid medium is a liquid which contains a substance capable of dipole-dipole, dipole-ion or ion-ion interactions. For the purposes of the present invention, these media contain essentially $C_1$–$C_6$-alkanols, in particular the aforementioned alkanols from which the alkoxide radicals are derived. Of these alkanols, methanol, ethanol and isopropanol are preferred and methanol and ethanol are very particularly preferred.

In addition, these media may contain suitable additives. These additives, which may be included to adjust the viscosity, the pH or the rate of evaporation or to raise or lower the rate of elimination of alcohol from the alkoxides, must be soluble (molecularly dispersible) in the media and must neither form any insoluble products with the other components in the course of time nor, if still present in intermediate layer (b) after preparation thereof, have an adverse effect on the properties of the layer. Examples of suitable additives are higher-boiling alcohols such as octanol, glycol ethers such as diethylene glycol monomethyl ether, ketones such as acetone, methyl ethyl ketone or methyl isobutyl ketone, esters such as methyl acetate, ethyl acetate or isopropyl acetate, ammonia, hydrazine or amines such as methylamine, dimethylamine, trimethylamine, ethylamine, diethylamine, triethylamine or ethyldimethylamine. The amount of additives should in general not account for more than 20% by weight of the liquid medium.

The amount of alkoxide dissolved in these polar liquid media can vary within wide limits. It depends in particular on the thickness desired for the intermediate layer (b) and on the method of applying the solution to the surface of the base material (a) in process step 2.2. In general, this amount is within the range from 0.5 to 10% by weight, based on the total amount of solution.

The applying of solution in process step 2.2 has no special methodic features, being effected in the usual way of preparing thin, liquid layers by spin coating, dip coating, extrusion coating, knife coating, brush coating, roll coating, screen printing or spraying. Of these methods, spin coating is preferred.

Thereafter the thin, solvent-moist layer present on the surface of the base material is converted in process step 2.3 into intermediate layer (b) by heat treatment. To this end, in general, the solvent-moist layer is initially freed at below 50° C., preferably below 40° C., by drying, for example in a through-circulation cabinet, from the bulk of the polar, liquid medium, the result being a layer containing essentially the alkoxides. However, it is also possible to heat-treat the solvent-moist layer immediately after it has been applied, and without predrying.

The heat treatment is carried out in the presence of water at from 50 to 120° C. for from 5 minutes to 2 hours. In the course of the drying, the moist layer or alkoxide layer is converted into intermediate layer (b).

If this drying is carried out at below 50° C., then layers form within the specified time period which do not have the desired range of properties but show serious disadvantages such as high alkoxide content, insufficient air and solvent stability, low mechanical strength and low adhesion. If, however, temperatures above 120° C. are used, the base material (a) is permanently damaged, in particular in its fine surface structure. Moreover, the resulting layers then do not have the desired composition or the desired range of properties and instead are brittle, are liable to form cracks and can even become completely detached from the base material (a). Accordingly, intermediate layers (b) are reliably preparable and accurately reproducible only at from 50 to 120° C. Particularly good results are obtained at from 60 to 100° C., in particular at from 70 to 90° C.

As regards the duration of the heat treatment, 5 minutes should in general be the minimum length of time since otherwise the layers formed are of low quality.

Heat treatment times above 2 hours do not confer any additional benefits on the then resulting intermediate layer (b), but merely result in higher energy and time consumption, which is undesirable technically and commercially.

The heat treatment of the alkoxide layer is carried out in the presence of water. For rapid and reliable conversion of the alkoxide layer into intermediate layer (b) it is frequently sufficient here for the water to be present in very small amounts of below 1% by weight based on the alkoxide layer. However, it is also possible to use larger amounts of water. The optimum amount can be determined by simple preliminary trials. The optimum quantity of water depends primarily on the reactivity of the alkoxides used, on the duration of the heat treatment and on the temperature, but it can also depend on the specific surface properties of the base material (a) used.

The water can be added here in liquid form to the solvent-moist or to the substantially solvent-free alkoxide layer. This can be done by spraying or pouring water onto the layer. However, it is of advantage to carry out the heat treatment of the substantially solvent-free alkoxide layer in a water vapor-containing atmosphere which circulates above the layer and the water vapor content of which is regulated in a suitable manner and it is additionally of advantage to establish a high water vapor content at the start of the heat treatment and gradually or rapidly reduce this water vapor content in the course of the heat treatment to 0% or close to 0%.

If desired, the water may contain traces of ammonia, hydrazine or amines such as methylamine, dimethylamine, trimethylamine, ethylamine, diethylamine, triethylamine, pyridine, pyrazine, pyrrole, imidazole, pyrimidine, piperazine, pyrazolidine, imidazolidine, pyrrolidine or morpholine. Traces is here to be understood as meaning an amine content in the water of below 1% by weight.

The heat treatment per se requires no special purpose-built equipment; it is instead carried out in conventional equipment, for example through-circulation cabinets or drying lines, in a batchwise or continuous manner.

A further constituent of the recording material according to the invention is the dimensionally stable, optically clear, base material (a) composed of a plastics substance and having a structured surface.

Base materials of this kind are known per se. Generally, they take the form of flat disks 90 or 130 mm in diameter, which generally come into consideration for data disks. They are generally produced by shape-conferring processing of plastics materials or plastics precursors.

Customarily, this shape-conferring processing takes the form in the case of plastics materials of injection holding a plastics melt, while in the case of plastics precursors, such as epoxy resins or mixtures crosslinkable by photopolymerization, the preferably liquid precursors are as per usual poured into a mold and then cured thermally or by exposure to actinic light.

Of the methods of carrying out the shape-conferring processing, injection molding is in general preferred. Examples of plastics materials suitable for base material (a) are polymethyl methacrylate, polycarbonate, polyvinyl chloride, vinyl chloride copolymers, polystyrene, polystyrene/polyphenylene ether blends, polyethylene terephthalate and styrene-acrylonitrile copolymers.

A further essential constituent of the recording material according to the invention is the recording layer (c).

The recording layer (c) contains or comprises one or more dyes. If it contains dyes, they are generally present finely divided in suitable binders, such as polymethyl methacrylate, polystyrene, polyamide, polyvinyl alcohol, methylcellulose, polyvinyl butyral, polyethylene, polyisobutyl acrylate or polyethylene oxide. Moreover, the dyes may be bonded to the binders via ionic bonds or via metal-containing groups. Furthermore, they may be bonded to the binders via covalent bonds, as for example in liquid-crystalline polymers containing pendant dye radicals, or they form part of the polymer main chain of the binder. Also, low or high molecular weight liquid crystalline compounds may additionally be present.

Suitable dyes for recording layer (c) can come from any class of dye. Examples of classes of dyes from which particularly many highly suitable dyes come are the classes of the azo, naphthol, pyrazolone, stilbene, thiazole, anthraquinone, anthrone, indigo, acridine, triphenylmethane, metal chelate, xanthene, thioxanthene, oxazine, phthalocyanine, polymethine, triquinocyclopropane or squarylium dyes.

The recording layer (c) is in general from 50 to 200 nm, preferably from 80 to 160 nm, in particular from 100 to 130 nm, in thickness.

The recording layer (c) is produced by applying a solution containing the dye(s) and any other constituents present to the surface of the intermediate layer (b) and drying the resulting solvent-moist layer. Here the aforementioned customary and known methods of producing liquid thin layers can be used. Suitable solvents are here the customary known, polar and apolar organic solvents, such as alcohols, ketones, esters and ethers, aliphatic or aromatic hydrocarbons or halogenated hydrocarbons.

Besides base material (a), intermediate layer (b) and recording layer (c), the recording materials according to the invention may contain further layers which can likewise be of importance for the functioning of the recording materials, for example customary and known reflection layers, antireflection layers or adhesion-promoting layers or layers which on heating decompose and form gases. In addition, the recording layers (c) may be covered with optically clear protective layers which prevent dirt particles or scratches from coming to lie in the laser focus. In general, the existing polymers customary for this purpose are used, or silicon dioxide. For this purpose the recording material according to the invention can additionally also be bonded to an optically clear dust hood in a conventional manner, for example by ultrasound welding.

Two recording materials according to the invention can also be bonded to each other to form a pair in such a way that their recording layers (c) are parallel and face each other with a certain distance in between. This distance can be brought about in a conventional manner with the aid of spacers, such as webs or short columns. However, an individual recording material according to the invention can also have two recording layers (c) on the mutually opposite sides of base material (a).

The recording materials according to the invention are written with analogue or digital data by means of a write laser beam, the former, as is known, being written with an analogue-modulated continuous wave laser and the latter with a pulse code modulated laser.

In general, suitable lasers have a power output of from 1 to 20 mW at the write wavelength λ. The focus diameter of the write laser beam is in general from 300 to 2,000 nm. In general, the pulse period of a pulse code laser is from 10 to 1,000 ns. Advantageously, the write laser beam emits light of the wavelength λ which is readily absorbed by the particular recording layer (c). Advantageous wavelengths λ are those from 400 to 1,000 nm.

In writing, the laser beam is guided in a relative movement over the recording material and is perpendicularly incident thereupon while being focused on the recording layer (c). At the point of incidence the recording layer (c) is locally heated, and thermally altered areas are produced, for example in the form of holes, pits, spots or relief structures. On writing data with pulse code modulated lasers these areas essentially have a round or oval shape from 100 to 2,000 nm in diameter, while if written with an analogue-modulated continuous wave laser they can have any desired shape.

The recording materials according to the invention are highly suitable for ablative and deformative laser optical data recording. Beyond that, they are highly suitable for laser-optical data recording by phase change, where the data are written in the form of thermally altered areas whose reflectivity is substantially higher than that of the unwritten areas, thereby producing a particularly strong optical contrast.

The writing of the data into the recording layer (c) can be effected from the base material (a) remote side of the layer or from the other side of the optically clear base material (a). The latter option is of particular advantage.

The written data are read by means of a read laser beam. The power output of the read laser at the read wavelength λ' is below the threshold power level at which writing becomes possible. In general, the power output is within the range from 0.1 to 2 mW. It is advantageous to use laser light of wavelength λ' which is strongly reflected by the recording layer. Wavelength λ' of from 400 to 1,000 nm, in particular from 630 to 900 nm, are advantageous.

In the read process too the laser beam in question is guided in a relative motion across the recording material and is perpendicularly incident thereupon while being focused on the recording layer (c).

If, in scanning across the recording layer (c), the read laser beam impinges upon a thermally altered area, for example a spot, this changes the properties of the light transmitted or reflected by the recording material, and this change can be picked up by means of suitable detectors.

The direction of the reading of the data in the recording layer (c) can be from the base material (a) remote side of the layer or from the other side of the optically clear, transparent base material (a), the latter option being of advantage. It is here particularly advantageous to detect the reflected light.

It is also of very particular advantage to use for this purpose write and read lasers which emit laser radiation within the infrared wavelength range of from 630 to 900 nm, and it is also of advantage if the write wavelength λ is identical to the read wavelength λ' or only very little different therefrom. Light of these wavelengths is supplied by customary and known semiconductor lasers.

The recording materials according to the invention are thus preferably written according to the invention with pulse code modulated laser light of the wavelength λ of from 630 to 900, in particular of from 740 to 850, nm from the side of the optically clear, transparent base material (a).

Thereafter the written recording materials are read in a preferred manner according to the invention with laser light of wavelength λ' of from 630 to 900, in particular from 740 to 850 nm from the side of the optically clear, transparent base material (a), and the light reflected by the recording layer (c) is detected.

If the recorded materials according to the invention are present in the form of data disks, the reading and writing of digital data is carried out with customary and known disk drives. Such a disk drive contains essentially a disk turntable and a laser-optical write and read head and in addition mechanical servo means for correcting the track position, autofocusing means, optical elements for analyzing track position and autofocus errors, detector means together with preceding optical components for collecting the read laser beam light reflected back by the data disk, and suitable electronic components. Customarily, a laser-optical write and read head contains laser diodes which emit infrared light and are composed of semiconductor materials containing GaAlAs. In addition, such a write and read head generally further contains suitable optical components such as dielectric beam splitters, polarizing beam splitters or polarization-independent beam splitters and a λ/4 or λ/2 plate.

The recording materials according to the invention have numerous particular advantages.

For instance, they are simple to manufacture, their range of properties being particularly easily and consistently reproducible. In particular, the thickness and the composition of the intermediate layer (b) are finely adjustable, so that their range of properties is outstandingly adaptable to the remaining physical and material parameters.

Furthermore, the intermediate layer (b) brings about better adhesion of the recording layer (c) to the base material (a). What is more, it actively suppresses the harmful crystallization of dyes in the recording layer (c) and thus contributes appreciably to prolonging the life of the recording material.

Nor does the intermediate layer (b) of the recording material according to the invention distort the surface structure of base material (a) essential for tracking. The recording material according to the invention therefore makes it possible for the track position servo and autofocusing means of conventional disk drives to perform to a very high level of precision. In fact, the track position servo and autofocusing means respond even better to the recording material according to the invention than to recording materials containing no or none other than prior art intermediate layers.

All in all, the recording material according to the invention has a longer life, is writable with comparatively low laser power and shows a signal-to-noise ratio of above 45 dB. Owing to its particularly high bit density and its markedly low bit error rate, the recording material according to the invention is highly suitable for recording video signals. It is also suitable for use as an archive data disk.

EXAMPLES

In the Examples and Comparisons below, the thicknesses of the individual layers were determined by means of scanning electron micrographs.

The material compositions of intermediate layers (b) were determined by the ESCA method. To this end the intermediate layers (b) were exposed to $MgK_\alpha$ X-rays of 1253.6 eV.

The signal-to-noise ratio was determined in a conventional manner on recording materials written with the aid of a pulse code modulated laser (wavelength $\lambda$ of emitted light: 830 nm; pulse duration 500 ns; beam power: 6 mW). To this end the recording materials were read by means of a continuous wave laser (wavelength $\lambda'$ of emitted light: 780 nm; beam power: 0.5 mW) from the side of the base material. The emitted read laser beam was always guided over the recording layers at a relative speed of 4 m/s. It was always the light reflected by the recording materials which was detected and analyzed.

In the Examples and Comparisons below, use was made of base materials (a) containing on the surface customary and known, concentric tracks. The depressed parts thereof are generally referred to as grooves and the raised parts as land. The tracks aid the accurate guidance of the write and read laser beams emitted by the laser-optical write and read head of the disk drive. To this end it is necessary that the track position servo means present in the laser optical head receive sharp optical signals. These signals are due to the diffraction of the laser light reflected back from the recording material to the laser optical head at the border between groove and land, and are detected and analyzed by means of the photodiode arrangements customary and known for this purpose. To ensure good guidance or tracking, in particular of the read laser beam, it is essential that a higher optical contrast exists between land and groove since otherwise only weak and broadened signals or even no signals at all are received. The latter possibility is frequently the case with written recording materials. The consequence, however, is a low signal-to-noise ratio and difficulty in relocating the written data. The quality of tracking is therefore generally measured in terms of the breadth of the signals and the difference in intensity between groove and land reflected laser light. An additional quality criterion is whether this difference in intensity is constant and high across the whole diameter of the recording material.

In what follows, accordingly, the tracking behavior of the recording materials was determined by reading the materials with a read laser beam ($\lambda'$ = 780 nm; beam power: 0.5 mW) transversely to the tracks across the entire diameter of the recording material. The reflected laser light was gathered by means of customary known optical arrangements, passed to photodiodes and converted by suitable electronic components into electrical signals whose height was recorded as a function of the diameter. It was assessed whether the differences between the height of the signals obtained from the lands and the height of the signals obtained from the grooves were consistently sharp and high across the entire diameter of the recording material, the basis for the assessment being the following ratings of the tracking behavior:

| | |
|---|---|
| very good | sharp signals; high difference between the heights of the land and groove signals, constant across the entire diameter; |
| good | broadened signals; small difference between the signal heights in question, showing little variation across the entire diameter; |
| unsatisfactory | broad, indistinct signals; little difference between the signal height in question; and this difference may additionally vary to a certain extent across the entire diameter; |
| poor | no longer any difference between the signal heights in question. |

To test whether the act of writing the recording materials had any effect any their tracking properties, not only unwritten but written recording materials were measured and rated as explained above. If this assessment revealed serious differences in the tracking quality of a recording material in the unwritten state on the one hand and in the written state on the other, this was considered to be a serious disadvantage. If this difference in quality was small given an otherwise high level of performance, this testified to the particular advantageousness of the recording material in question.

EXAMPLES 1 TO 25

A. Production of laser-optical data disks according to the invention; general method of production:

To produce the data disks, the customary and known optically clear injection-molded polycarbonate disks 1.2 mm in thickness and 130 mm in diameter bearing concentric tracks were used as base materials (a).

The structured surface of these base materials (a) was spun-coated with solutions of alkoxides and a methanol-/ethanol mixture (volume ratio 2:3) in such a way as to produce on drying of the wet layers at 40° C. in a through-circulation cabinet alkoxide layers from 60 to 120 nm in thickness. In the case of Examples 2 to 5, the methanol/ethanol mixtures in question additionally contained additives, such as diethylene glycol monomethyl ether, ammonia or trimethylamine.

The alkoxide layers present on the base materials (a) were then heat-treated at from 50 to 120° C. in a through-circulation cabinet where the air had a relative moisture content of 75%. In the case of Examples 3 to 5, the air additionally contained 20 ppm of ammonia, trimethylamine or imidazole.

This resulted in base materials (a) having intermediate layers (b) on their structured surface.

Using this general method, in each Example three data disks were produced, of which one for each Example was used to analyze the intermediate layer (b) (samples 1). The remaining two data disks (samples 2 and 3) were each further processed in the same way and thus served as evidence of the good reproducibility of the manufacturing process.

The intermediate layers (b) were analyzed by scanning electron micrographs of and ESCA measurements on samples 1.

The intermediate layers (b) of samples 2 and 3 were spun-coated with a mixture of, based on the solution, 3% by weight of the dye tris(3,5-diisopropylquino)cyclopropane (cf. EP-A-0,193,892), 1% by weight of methyl methacrylate/methacrylic acid (70:30) copolymer (polymeric binder) and 96% by weight of chloroform (solvent) in such a way as to produce on drying amorphous, dye-containing recording layers (c) 100 nm in dry film thickness.

The material and physical parameters of the manufacturing process are given in Table 1, as are the results of the analyses on intermediate layers (b) produced by the process according to the invention.

B. Testing of laser-optical data disks according to the invention (samples 2 and 3):

First, the tracking behavior of the unwritten data disks was determined and rated by the abovementioned method. Thereafter the data disks were written with data. This was done with a pulse code modulated laser beam of the aforementioned specification. Thereafter the signal-to-noise ratio and the tracking behavior of the written data disks were determined in the above-described manner.

The results of these tests are given in Table 2, where it is also stated whether an accurately reproducible range of properties was obtained for the data disk of the particular example.

COMPARISON C1

Production and testing of a prior art laser-optical data disk; production and test method:

Example 1 was repeated, except that the place of the intermediate layer (b) described there was taken by 500 nm thick intermediate layers produced as described in Example 5 of US-A-4,622,261.

The material and physical parameters of the prior art production process are included in Table 1 for comparison with the parameters according to the invention.

The testing was performed as indicated for Examples 1 to 25. The test results are included in Table 2 for comparison with the results obtained on (samples 2 and 3 of) data disks 1 to 25 according to the invention.

The comparison shows that the range of properties of the prior art data disks C1 showed poor reproducibility and as a whole fell a long way short of the range of properties of the data disks according to the invention.

COMPARISON C2

Production and testing of a prior art laser optical data disk; production and test method:

Example 1 was repeated, except that intermediate layer (b) described there was replaced by 55 nm thick vapor deposited silicon dioxide layers.

The material and physical parameters of the prior art production process are included in Table 1 for comparison with the parameters according to the invention.

The testing was performed as indicated for Examples 1 to 25. The test results are included in Table 2 for comparison with the results obtained on (samples 2 and 3 of) data disks 1 to 25 according to the invention.

The comparison shows that although the range of properties of the prior art data disks C2 was readily reproducible, it otherwise was no match for the range of properties of the data disks according to the invention.

TABLE 1

Production of novel and prior art laser optical data disks; parameters of production processes

| Example and data disk (3 samples each) No. | Intermediate layer (b) | | | | Properties (determined on Sample 1) | | |
|---|---|---|---|---|---|---|---|
| | Production: | | Heat treatment: | | Thickness (nm) | Composition | |
| | Alkoxide (% by weight)[1] | Additive (% by weight)[1] | Time and temperature | Additive to air | | Oxide/hydrated oxide (% by weight)[2] | Hydrocarbon radicals (% weight)[2] |
| 1 | Si(OCH$_3$)$_4$ (3) | — | 5 min at 110° C. | — | 55 | 95.5 | 4.5 |
| 2 | Si(OCH$_3$)$_4$ (2.7) | NH$_3$ (0.5) | 20 min at 80° C. 40 min at 90° C. | — | 52 | 95.2 | 4.8 |
| 3 | Si(OCH$_3$)$_4$ (2) | NH$_3$ (0.6) | 120 min at 50° C. | NH$_3$ | 60 | 88.5 | 11.5 |
| 4 | Si(OCH$_3$)$_4$ (3.1) | diethylene glycol monomethyl ether (2) | 10 min at 120° C. | N(CH$_3$)$_3$ | 51 | 99.3 | 0.7 |
| 5 | Si(OC$_2$H$_5$)$_4$ (2.5) | N(CH$_3$)$_3$ (0.2) | 80 min at 70° C. | Imidazole | 70 | 92.3 | 7.7 |
| 6 | Si(OCH$_3$)$_4$ (1.2) + Si(O-i-C$_3$H$_7$)$_4$ (1.8) | — | 15 min at 60° C. 60 min at 95° C. | — | 95 | 95.1 | 4.9 |
| 7 | Ti(OC$_2$H$_5$)$_4$ (2) | — | 5 min at 100° C. 10 min at 120° C. | — | 40 | 98.3 | 1.7 |
| 8 | Zr(OCH$_3$)$_4$ (3.6) | — | 20 min at 70° C. 40 min at 90° C. | — | 90 | 97 | 3 |
| 9 | Hf(OC$_2$H$_5$)$_4$ (1.9) | — | 30 min at 80° C. | — | 35 | 98.7 | 1.3 |
| 10 | Th(OC$_2$H$_5$)$_4$ (3) | — | 5 min at 120° C. | — | 40 | 99.4 | 0.6 |
| 11 | VO(OC$_2$H$_5$)$_3$ (2) | — | 10 min at 90° C. 30 min at 110° C. | — | 60 | 98 | 2 |
| 12 | NbO(O-i-C$_3$H$_7$)$_3$ (1.2) | — | 8 min at 70° C. 100 min at 110° C. | — | 57 | 94.3 | 5.7 |
| 13 | TaO(O-i-C$_3$H$_7$)$_3$ (2) | — | 10 min at 115° C. | — | 43 | 96 | 4 |
| 14 | WO$_2$(OCH$_3$)$_2$ (1.5) | — | 15 min at 80° C. | — | 45 | 99.4 | 0.6 |
| 15 | Al(OCH$_3$)$_3$ (2) | — | 120 min at 55° C. | — | 51 | 88.9 | 11.1 |
| 16 | Al(OCH$_3$)$_3$ (3.1) | — | 50 min at 70° C. | — | 53 | 92.7 | 7.3 |
| 17 | Al(OCH$_3$)$_3$ (2.8) | — | 20 min at 90° C. | — | 51 | 94.5 | 5.5 |

TABLE 1-continued

Production of novel and prior art laser optical data disks; parameters of production processes Intermediate layer (b)

| Example and data disk (3 samples each) No. | Production: Alkoxide (% by weight)[1] | Production: Additive (% by weight)[1] | Heat treatment: Time and temperature | Heat treatment: Additive to air | Thickness (nm) | Composition Oxide/hydrated oxide (% by weight)[2] | Composition Hydrocarbon radicals (% weight)[2] |
|---|---|---|---|---|---|---|---|
| 18 | Al(OC$_2$H$_5$)$_3$ (2.9) | — | 5 min at 100° C. 10 min at 120° C. | — | 57 | 96.8 | 3.2 |
| 19 | Ga(OC$_2$H$_5$)$_3$ (3) | — | 15 min at 80° C. | — | 47 | 93.4 | 6.6 |
| 20 | In(OCH$_3$)$_3$ (2.6) | — | 5 min at 90° C. 20 min at 120° C. | — | 63 | 97.2 | 2.8 |
| 21 | Ge(OC$_2$H$_5$)$_4$ (4) | — | 20 min at 70° C. 60 min at 90° C. | — | 90 | 92.1 | 7.9 |
| 22 | Sn(OCH$_3$)$_4$ (3) | — | 120 min at 60° C. | — | 53 | 93 | 7 |
| 23 | Sn(OC$_2$H$_5$)$_4$ (3.1) | — | 40 min at 70° C. 60 min at 80° C. | — | 60 | 94.2 | 5.8 |
| 24 | Sn(OCH$_3$)$_4$ (2.9) — Sn(OC$_2$H$_5$)$_4$ (4) | — | 20 min at 80° C. 60 min at 110° C. | — | 59 | 96 | 4 |
| 25 | Sn(OCH$_3$)$_4$ (3.2) | — | 10 min at 120° C. | — | 70 | 97.4 | 2.6 |
| Comparison |  |  |  |  |  |  |  |
| C1 | Si(OCH$_3$)$_4$ | — | 5 sec at 2,500° C. | — | 500 | >99.8 | <0.1 |
| C2 | Vacuum vapor deposition of SiO$_2$ |  |  |  | 55 | >99.9 |  |

[1]based on total amount of alcoholic solution
[2]based on intermediate layer (b)

TABLE 2

Properties of novel and prior art recording materials

| Example and data disk (2 samples each) No | Tracking behavior Before writing Sample 2 Rating | Before writing Sample 3 Rating | After writing Sample 2 Rating | After writing Sample 3 Rating | Signal-to-noise ratio Sample 2 dB | Signal-to-noise ratio Sample 3 dB | Reproducibility of range of properties |
|---|---|---|---|---|---|---|---|
| 1 | very good | very good | very good | very good | 49 | 49 | very good |
| 2 | very good | very good | very good | very good | 49 | 49 | very good |
| 3 | very good | very good | very good | good/very good | 46 | 44 | good/very good |
| 4 | very good | very good | good/very good | very good | 45 | 48 | very good |
| 5 | very good | very good | good/very good | good/very good | 46 | 46 | very good |
| 6 | good | good | good | good | 45 | 46 | very good |
| 7 | very good | very good | very good | very good | 50 | 49 | very good |
| 8 | good/very good | good/very good | good | good | 47 | 45 | good |
| 9 | good | good | good | good | 47 | 49 | very good |
| 10 | very good | good/very good | very good | good/very good | 49 | 46 | good |
| 11 | good | good | good | good | 45 | 46 | good |
| 12 | good | good/very good | good | good | 48 | 47 | very good |
| 13 | very good | good/very good | good | good | 45 | 45 | good |
| 14 | good | good | good | good | 46 | 45 | very good |
| 15 | very good | good/very good | very good | good | 50 | 46 | good |
| 16 | very good | very good | very good | very good | 52 | 54 | very good |
| 17 | very good | very good | very good | very good | 54 | 53 | very good |
| 18 | very good | very good | very good | very good | 50 | 49 | very good |
| 19 | good/very good | good | good | good | 47 | 48 | very good |
| 20 | good/very good | good/very good | good | good | 46 | 46 | very good |
| 21 | good | good | good | good | 45 | 46 | very good |
| 22 | very good | very good | very good | very good | 49 | 50 | very good |
| 23 | very good | very good | very good | very good | 51 | 50 | very good |
| 24 | very good | very good | very good | very good | 50 | 52 | very good |
| 25 | very good | very good | very good | good/very good | 49 | 47 | good/very good |
| V1 | unsatisfactory | unsatisfactory | poor | poor | 42 | 35 | poor |
| V2 | poor | unsatisfactory | poor | poor | 38 | 39 | good |

TABLE 2-continued

Properties of novel and prior art recording materials

| Example and data disk (2 samples each) No | Tracking behavior | | | | Signal-to-noise ratio | | Reproducibility of range of properties |
|---|---|---|---|---|---|---|---|
| | Before writing | | After writing | | | | |
| | Sample 2 Rating | Sample 3 Rating | Sample 2 Rating | Sample 3 Rating | Sample 2 dB | Sample 3 dB | |
| | | to poor | | | | | |

We claim:

1. A planar, multilayered, laser-optical recording material, comprising
   (a) a dimensionally stable, optically clear base material composed of a plastics substance and having a structured surface,
   (b) a superposed intermediate layer which is insoluble in organic solvents and which acts as a diffusion barrier thereagainst, and superposed thereon
   (c) an amorphous, thermally alterable, dye-containing recording layer producible by application from a solution and drying,
   wherein said intermediate layer (b)
   ($b_1$) is from 5 to 95 nm thick and, based on (b), consists of
   ($b_2$) from 88 to 99.5% by weight of an oxide and/or hydrated oxide of one or more of the elements of the group consisting of titanium, zirconium, hafnium, thorium, vanadium, niobium, tantalum, tungsten, aluminum, gallium, indium, silicon, germanium and tin and of
   ($b_3$) from 0.5 to 12% by weight of a hydrocarbyl and
   ($b_4$) is producible by dissolving one or more alkoxides of one or more of the abovementioned elements in a polar liquid medium essentially comprising a $C_1-C_6$-alkanol, applying this solution to the surface of base material (a) and heat-treating the moist layer obtainable in this way in the presence of water at from 50 to 120° C. for from 5 minutes to 2 hours.

2. The recording material of claim 1, wherein said intermediate layer (b) consists of from 92 to 98% by weight of an oxide and/or hydrated oxide of one or more of the elements of the group consisting of titanium, zirconium, aluminum, silicon and tin and of from 2 to 8% by weight of a hydrocarbyl.

3. A process for producing a planar, multilayered, laser-optical recording material comprising 1. producing a dimensionally stable, optically clear base material (a) having a structured surface by shape-conferring processing of a plastics material or of a plastics precursor,
2. applying an intermediate layer (b) which is insoluble in organic solvents and which acts as a diffusion barrier thereagainst to the structured surface of the base material (a) in a dry film thickness of from 5 to 95 n by
   2.1 dissolving one or more alkoxides of one or more of the elements of the group consisting of titanium, zirconium, hafnium, thorium, vanadium, niobium, tantalum, tungsten, aluminum, gallium, indium, silicon, germanium and tin in a polar liquid medium essentially comprising a $C_1-C_6$-alkanol,
   2.2 applying the resulting solution to the structured surface of the base material (a) and
   2.3 heat treating the layer obtained in this way in the presence of water at from 50 to 120° C. for from 5 minutes to 2 hours, and
3. preparing an amorphous, thermally alterable, dye-containing recording layer (c) on intermediate layer (b) by applying a dye-containing solution and drying the moist layer thus obtained.

4. The process of claim 3, wherein the moist layer obtained in process step 2.2 is freed at below 50° C. from the bulk of the polar, liquid medium prior to the heat treatment (process step 2.3).

5. The process of claim 3, wherein, in process step 2.3, the water is added to the layer as a liquid.

6. The process of claim 3, wherein process step 2.3 is carried out in the presence of water vapor.

7. The process of claim 3, wherein, in process step 2.3, additionally ammonia, hydrazine, methylamine, dimethylamine, trimethylamine, ethylamine, diethylamine, triethylamine, pyridine, pyrazine, pyrrole, imidazole, pyrimidine, piperazine, pyrazolidine, imidazolidine, pyrrolidine or morpholine is added to the water in a trace amount.

* * * * *